United States Patent
Bassov

(10) Patent No.: US 11,847,095 B1
(45) Date of Patent: Dec. 19, 2023

(54) MANAGING TRUNCATION OF FILES OF FILE SYSTEMS

(71) Applicant: EMC Corporation, Hopkinton, MA (US)

(72) Inventor: Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 749 days.

(21) Appl. No.: 14/983,699

(22) Filed: Dec. 30, 2015

(51) Int. Cl.
 *G06F 7/00* (2006.01)
 *G06F 16/17* (2019.01)
 *G06F 16/23* (2019.01)

(52) U.S. Cl.
 CPC ...... *G06F 16/1727* (2019.01); *G06F 16/2365* (2019.01)

(58) Field of Classification Search
 CPC .............. G06F 17/30138; G06F 16/30; G06F 16/2365; G06F 16/1727; G06F 16/1787
 USPC .......................... 707/693, 803, 813, 999.205
 See application file for complete search history.

(56) References Cited

U.S. PATENT DOCUMENTS

| | | | | |
|---|---|---|---|---|
| 6,697,846 B1* | 2/2004 | Soltis | ..................... | G06F 16/182 709/217 |
| 7,889,973 B2* | 2/2011 | Poslinski | ................. | H04N 5/76 386/278 |
| 8,185,523 B2* | 5/2012 | Lu | ............................. | G06N 3/08 707/723 |
| 9,891,860 B1* | 2/2018 | Delgado | ................. | G06F 3/065 |
| 2003/0212873 A1* | 11/2003 | Lee | ........................ | G06F 9/5016 711/170 |
| 2004/0003088 A1* | 1/2004 | Ng | ........................ | G06F 9/5016 709/226 |
| 2007/0260842 A1* | 11/2007 | Faibish | .................... | G06F 3/061 711/170 |
| 2007/0299884 A1* | 12/2007 | Komori | ................. | G06F 3/0605 |
| 2009/0006496 A1* | 1/2009 | Shoens | ............... | G06F 16/1873 |
| 2010/0179959 A1* | 7/2010 | Shoens | ................. | G06F 16/128 707/758 |
| 2013/0019320 A1* | 1/2013 | Ericsson | ................. | G06F 21/62 726/28 |
| 2015/0242309 A1* | 8/2015 | Talagala | .............. | G06F 12/0246 711/103 |
| 2015/0261436 A1* | 9/2015 | Chang | ..................... | G06F 3/061 711/103 |
| 2015/0324371 A1* | 11/2015 | Guo | .......................... | G06F 3/06 707/693 |
| 2016/0063018 A1* | 3/2016 | Das | ...................... | G06F 16/1752 707/822 |
| 2016/0371190 A1* | 12/2016 | Romanovskiy | ......... | G06F 3/067 |
| 2017/0132242 A9* | 5/2017 | Gunda | ................ | G06F 16/1748 |
| 2017/0177447 A1* | 6/2017 | Golander | ............ | G06F 16/1815 |
| 2017/0337212 A1* | 11/2017 | Hayasaka | ............... | G06F 3/061 |
| 2018/0004676 A1* | 1/2018 | Imazaki | ............. | G06F 11/1076 |

* cited by examiner

*Primary Examiner* — Md I Uddin
(74) *Attorney, Agent, or Firm* — Krishnendu Gupta; Deepika Bhayana; Derek Lam

(57) ABSTRACT

A method is used in managing truncation of files of file systems. A request is received to delete a portion of a file of a file system. The file system includes a plurality of files. Metadata of the file is evaluated for determining a number of file system blocks associated with the portion of the file that are available for de-allocation. Storage space associated with the file system blocks is reported as available storage space to a user of the file.

18 Claims, 10 Drawing Sheets

MANAGING TRUNCATION OF FILES OF FILE SYSTEMS

CROSS REFERENCE TO RELATED APPLICATIONS

This application is related to co-pending U.S. patent application Ser. No. 14/870,514 entitled MANAGING TRUNCATION OF FILES OF FILE SYSTEMS filed on Sep. 30, 2015, which is incorporated herein by reference and co-pending U.S. patent application Ser. No. 14/870,556 entitled MANAGING TRUNCATION OF FILES OF FILE SYSTEMS filed on Sep. 30, 2015, which is incorporated herein by reference.

BACKGROUND

Technical Field

This application relates to managing truncation of files of file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, lnodern data storage systems ("storage systems") are put to a variety of commercial uses. For example, they are coupled with host systems to store data for purposes of product development, and large storage systems are used by financial institutions to store critical data in large databases.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in a hierarchy depending upon the size of a file where each level of indirect blocks includes pointers to indirect blocks at the next lower level.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file.

Although existing various methods provide reasonable means of writing data to file systems stored to a persistent storage, providing access to data of file systems and creating a replica of file systems, they also come with a number of challenges, especially when efficiently truncating a file of a file system. It may be difficult or impossible for the conventional file system facility to efficiently truncate a file of a file system.

SUMMARY OF THE INVENTION

A method is used in managing truncation of files of file systems. A request is received to delete a portion of a file of a file system. The file system includes a plurality of files. Metadata of the file is evaluated for determining a number of file system blocks associated with the portion of the file that are available for de-allocation. Storage space associated with the file system blocks is reported as available storage space to a user of the file.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
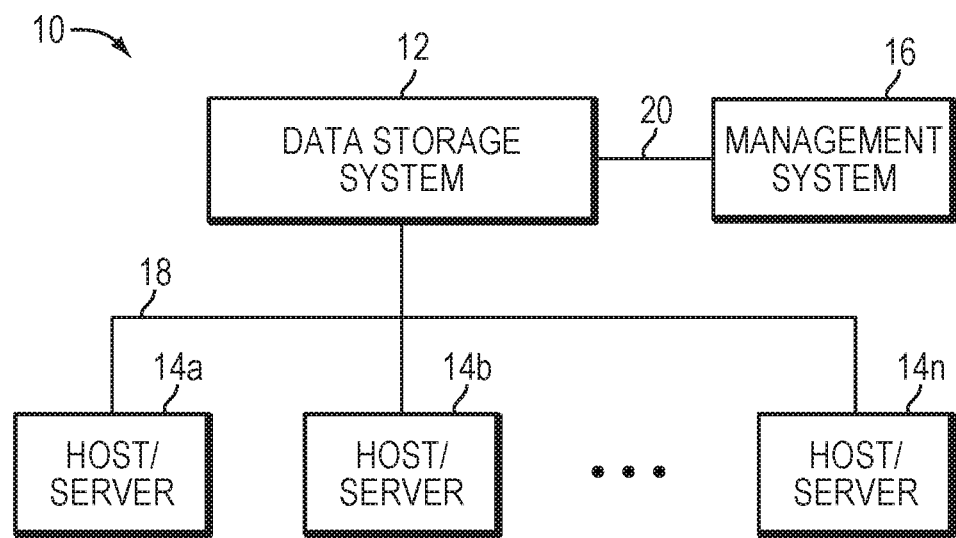
FIGS. 1-3 are examples of an embodiment of a computer system that may utilize the techniques described herein.

Described below is a technique for use in managing truncation of files of file systems, which technique may be used to provide, among other things, receiving a request to delete a portion of a file of a file system, wherein the file system includes a plurality of files, evaluating metadata of the file for determining a number of file system blocks associated with the portion of the file that are available for de-allocation, and reporting storage space associated with the file system blocks as available storage space to a user of the file.

Generally, a storage extent is a logical contiguous area of storage reserved for a user requesting the storage space. A storage extent may include a set of disks having different RAID levels. A disk may be a physical disk within the storage system. A LUN may be a logical unit number which is an identifier for a logical unit representing a portion of disk storage. Each slice of data may have a mapping to the location of the physical drive where it starts and ends. A LUN presented to a host system may be organized as a file system by a file system mapping logic of a storage system.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an Inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by a snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

Further, the delegated reference counting mechanism is also used by a deduplication facility for performing deduplication on a set of identical data blocks by sharing the set of identical data blocks and keeping a single copy of data block such that other identical data blocks point to the single copy of the data block.

Thus, a delegated reference count is a way of maintaining block ownership information for indicating whether or not each indirect block or data block of a file is shared with another version of the file or another identical data block. Further, as introduced above, files are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Further, when a sharing relationship of a file system block is broken, the reference count in the per-block metadata of the file system block is decremented by the delegated reference count associated with mapping pointer of the file system block.

A snapshot (also referred to herein as "replica", "checkpoint", and "snap") is a point-in-time copy of data (e.g., a production file). Generally, storage applications use snapshots to protect production data and ensure consistency of the production data. Generally, snapshots of data are created at a regular time interval (e.g., 10 minutes, 1 hour). Each snapshot of data has a unique identification. When an old snapshot is deleted, storage space allocated to the old snapshot is reclaimed and metadata associated with the old snapshot is updated appropriately. A set of replicas of a file (also referred to herein as "working file" or "primary file") may be logically organized together in a version set. A version set indicates a family of snapshot copies.

Typically, a file delete operation deletes a file of a file system in a storage system. When a file is deleted, each file system block of the file is deleted and marked as a free file system block. Further, a file may be truncated by deleting a portion of the file. Generally, during a file truncate operation, each file system block that is a part of a portion of the file which is being truncated is deleted. When a file system block is deleted, a parent file system block which includes a mapping pointer pointing to the file system block is updated to indicate that the mapping pointer no longer points to the file system block. By updating the mapping pointer in such a way creates a hole such that the mapping pointer is marked as unused indicating that the mapping pointer no longer points to any file system block.

Generally, upon receiving a request to delete a file or a portion of the file (also referred to herein as "truncating a file"), a file system hierarchy of the entire file or the portion of the file is iterated to free each file system block of the file system hierarchy of the entire file or the portion of the file. An indirect block at the lowest level of a file system hierarchy of a file is known as a leaf indirect block. Thus, each leaf indirect block of the file system hierarchy of a file or a portion of the file is processed for deleting data blocks pointed to by each leaf indirect block. It should be noted that a file delete or file truncate operation may either be executed on a primary file or any replica of the primary file.

Generally, a file truncate operation to truncate a file by deleting a portion of the file traverses a file system block hierarchy associated with the portion of the file in order to delete each file system block included in the portion of the file and de-allocates each file system block included in the portion of the file identified for deletion. Conventionally, storage space associated with a portion of a file identified for deletion is not presented to a user of the file as available storage space until file system blocks included in the portion are deallocated. Thus, in such a conventional system, if a delete operation or a truncate operation is performed on a large number of files, for example, hundreds of files with the size of 100 gigabytes (GB), the delete or truncate operations may require a large amount of time such as hours to delete or truncate the files because the delete or truncate operations either traverses the entire file system block hierarchy or a large portion of the file system block hierarchy of each file for de-allocating file system blocks thereby taking significant amount of time for reporting storage space of a file that is deleted as available storage space to a user of the file. Further, in such a conventional system, depending on the size of a file, truncate operation can potentially take hours to complete. Conventionally, when a truncate operation is performed synchronously on a file, a lock is acquired on the file for the entire duration of time the truncate operation is being performed on the file. Consequently, in such a conventional system, when a lock is acquired on a file for performing a truncate operation, a storage system is unable to perform any other operation on the file requested by clients of the storage system. Further, in such a conventional system, if a truncate operation is performed asynchronously on a file, it may be difficult or impossible to maintain correct locking semantics for processing various truncate, write and read operations being issued concurrently on the file. Thus, in such a conventional system, a significant amount of time is spent deleting a file thereby impacting performance of other I/O operations executing concurrently in a storage system and causing delay in reporting storage space available to users of the file. Thus, in such a conventional system, truncating a large number of files may consume a large amount of time thereby causing a delay in reclaiming storage space associated with portions of the files identified for truncation.

Generally, file truncate and file delete operations can be optimized by creating an internal snap shot copy of a file identified for truncation or deletion and deleting the file by using delegated reference count mechanism thereby improving performance of the file truncate and delete operations and reducing impact of the file truncate and delete operations on a storage system. In such a case, initially, each file system block included in a file are shared between the file and the internal snapshot copy of the file created upon receiving a truncate operation. Thus, a file can be truncated in a short amount of time because deleting such shared file system blocks include updating metadata of the file to indicate that the file no longer references the shared file system data blocks instead of having to deallocate each file system block as performed in a conventional system. Further, the internal snapshot copy of a file is deleted asynchronously in the background to deallocate file system blocks associated with a truncate operation directed to the file. It should be noted that an internal snapshot copy of a file created when performing a truncate operation is not visible to a user or host of a storage system but used internally by the storage system to efficiently truncate the file. Further, when a subsequent truncate operation is received for the file and an internal snapshot copy of the file is being truncated in background, another snapshot copy of the file is created to perform the subsequent truncation operation on the file.

Thus, generally, a file truncate operation may be performed in at least two phases —synchronous truncate operation and asynchronous truncate operation. Thus, as described above herein, when the synchronous truncate operation of creating an internal snapshot copy of a file is completed, a user of the file is notified that the file has been truncated. However, in a conventional system, file system blocks associated with a portion of a file being truncated are deallocated in background and storage space associated with the file system blocks is added to available storage space of the file as and when each file system block is deallocated. Thus, in such a conventional system, even though a file may be presented to a user of the file as truncated, storage space associated with a portion of the file being truncated is not presented to the user as available storage space because the storage space associated with the portion being truncated is presented to the user as available storage space only after file system blocks associated with the portion are deallocated.

By contrast, in at least one embodiment of the current technique, storage space associated with a portion of a file identified for deletion is presented to a user of the file as available storage space before file system blocks included in the portion are deallocated in background thereby making the process of deallocation of the file system blocks transparent to users of the file. Further, in at least one embodiment of the current technique, mapping pointer of each file system block included in a portion of a file identified for deletion is evaluated such that storage space associated with file system blocks that are uniquely allocated to the file and are not shared with any other replicas of the file are presented as free storage space of the file to a user of the file before such file system blocks are deallocated. The amount of time it takes to evaluate mapping pointers of file system blocks is significantly faster than the amount of time it takes to deallocate the file system blocks. Further, in at least one embodiment of the current technique, evaluation of mapping pointers of file system blocks of a file and determining the number of file system blocks that are uniquely allocated to the file may be performed either during the synchronous phase of a file truncate operation or asynchronous phase of the file truncate operation. Further, a uniquely allocated file system block indicates that such file system block is available for deallocation in such a way that storage space associated with such file system block can be deallocated and presented as free storage space. In such case, if a user or a client of a file is presented with available storage space associated with a file and the user issues an I/O (Input/Output) request that requires an allocation of a file system block, the user does not expect the I/O request to fail if the file does not have any available storage space. In such a case, if the file does not include any file system block available for allocation by an I/O request, the I/O request keeps pending and waits for the background process to deallocate file system blocks required for performing the I/O request. Further, a synchronization mechanism may be used to synchronize the process of de-allocating file system blocks and a thread issuing I/O requests. It should be noted that the current technique may be used to either truncate a file by deleting a portion of the file or truncate the entire file to size of 0 bytes. Thus, in at least one embodiment of the current technique, deallocation of file system blocks are performed separately from counting the number of file system blocks that may be available for deallocation thereby enabling a storage system to present available storage space to a user in a short amount of time and at the same time avoids errors resulting from insufficient storage space available for allocation.

A snap delete is a process that deletes file system blocks included in a file system hierarchy of a snap of a storage object such as a file by de-allocating the file system blocks. It should be noted that the term "snap delete", "replica delete", "file delete", and "file truncate" may be used herein interchangeably.

In at least one embodiment of the current technique, distributed weight for each shared data block included in a portion of file system hierarchy of a file identified for file truncation or file deletion is updated to return the weight value of a shared data block to an internal snapshot copy of the file indicating that the file no longer references to the shared data block. Thus, metadata of a file identified for truncation or deletion is updated in a short amount of time such that an internal snapshot of the file may be deleted at a later time to free storage resources associated with a portion of the identified for deletion during a truncate operation.

Generally, per-block metadata (also referred to herein as "BMD") of a file system block stores a total distributed reference count value for the file system block. Further, a metadata transaction entry created for a file system block that is being deleted indicates return of the reference count value (or "weight") of the file system block to the per-block metadata of the file system block.

Further, generally, a file system block associated with a portion of a file being truncated is deleted based on the ownership status of the file system block. Thus, a delete operation on a file system block decrements the reference count in the per-block metadata of a child block by a full weight or a partial weight depending on whether or not the deleted file system block did not share the child block or did share the child block.

Further, if a file system block is not shared but owned by a parent file system block which points to the file system block, the owned file system block is deleted by freeing the file system block. Further, when a file system block of a file of a file system is deleted, metadata such as superblock of the file, the size of the file, and a mapping pointer in a parent file system block pointing to the file system block is updated to indicate that the file system block is a free file system block which may be reused. It should be noted that any number of improvement may be employed when deleting a file system block shared between a file and an internal snapshot copy of the file.

In at least some implementations in accordance with the technique as described herein, the use of the managing truncation of files of file systems technique can provide one or more of the following advantages: improving I/O performance of a system by efficiently presenting available storage space to a user during a file delete and file truncate operations, improving host I/O performance by efficiently deleting or truncating a file by separating deallocation of file system block from determining the number of file system blocks that may be deallocated, improving performance of truncate or delete operations by efficiently using storage resources (e.g., CPU and cache) of a system, and efficiently truncating files by reporting storage space that will be freed as a result of truncating the files as available storage space to users of the files before the storage space is actually freed.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium

18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Massachusetts. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, MA). In such an arrangement, typically the file based storage hardware operates as a front-end to the block based storage system such that the file based storage hardware and the block based storage system form a unified storage system.

Figure 2:
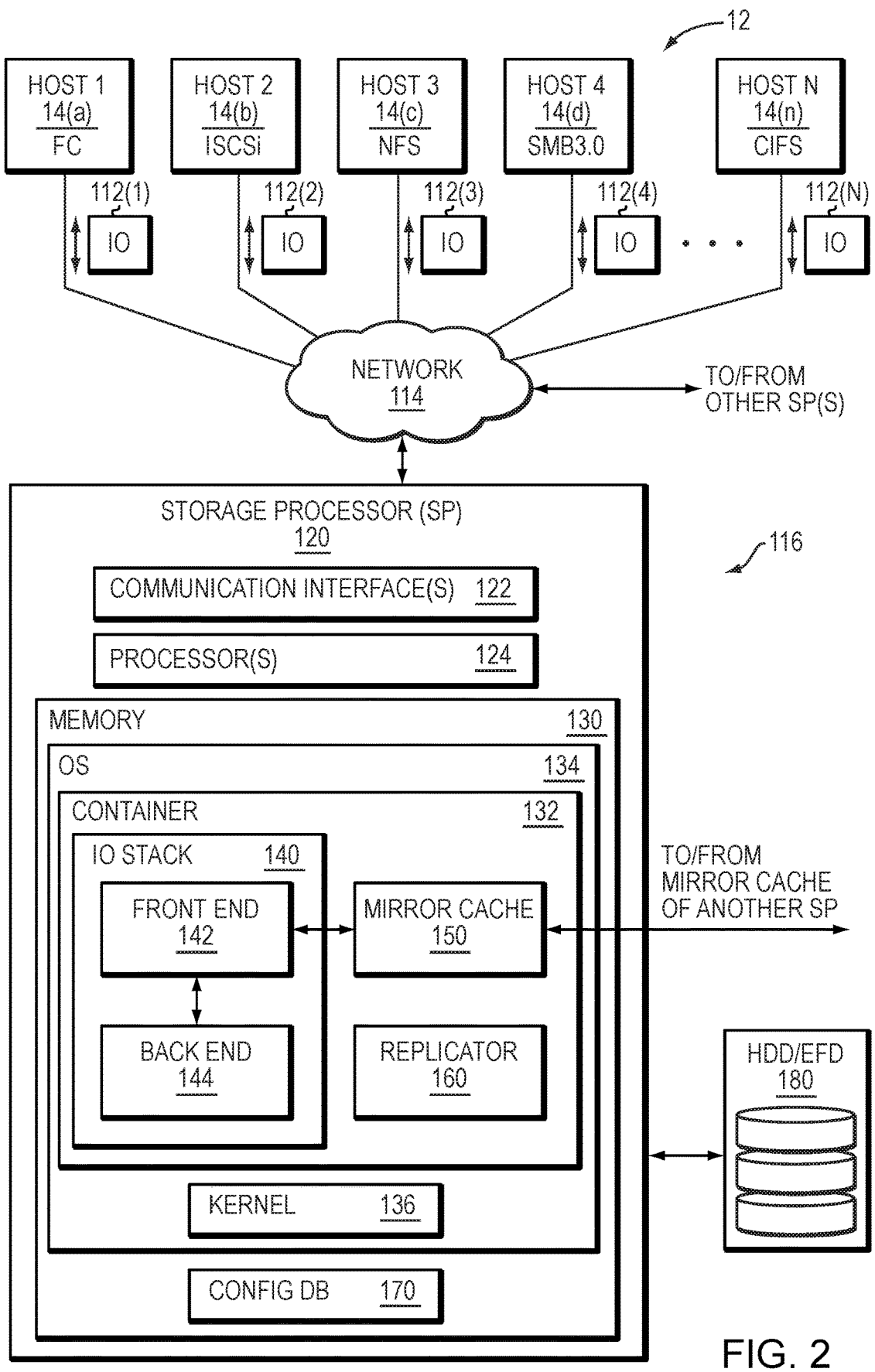

Referring now to FIG. 2, shown is an example of an embodiment of a computer system that may be used in connection with performing the technique or techniques described herein. FIG. 2 shows an example environment 12 in which embodiments of the improved technique hereof can be practiced. Here, multiple host computing devices ("hosts"), shown as devices 14(a) through 14(n), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 2, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 14(1-N) connect to the SP 120 using various technologies. For example, the host 14(1) can connect to the SP 120 using Fibre Channel (e.g., through a SAN). The hosts 14(2-N) can connect to the SP 120 using TCP/IP, to support, for example, iSCSI, NFS, SMB 3.0, and CIFS. Any number of hosts 14(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated user space execution context within the operating system 134. In various examples, the memory 130 may include multiple containers like the container 132, with each container providing its own isolated user space instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 2, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 14(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 2 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 3:
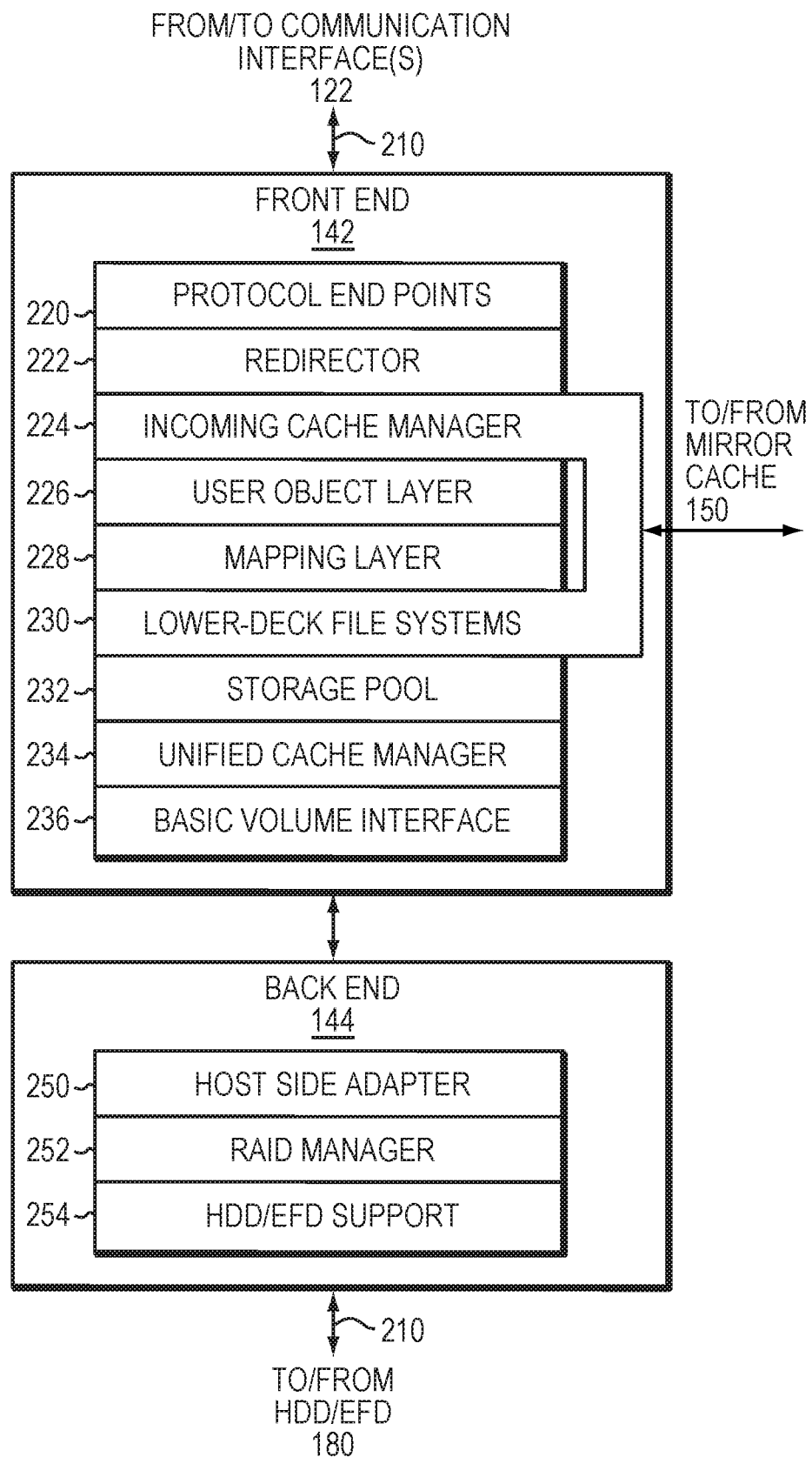

FIG. 3 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 14(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 14(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 2, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 4:
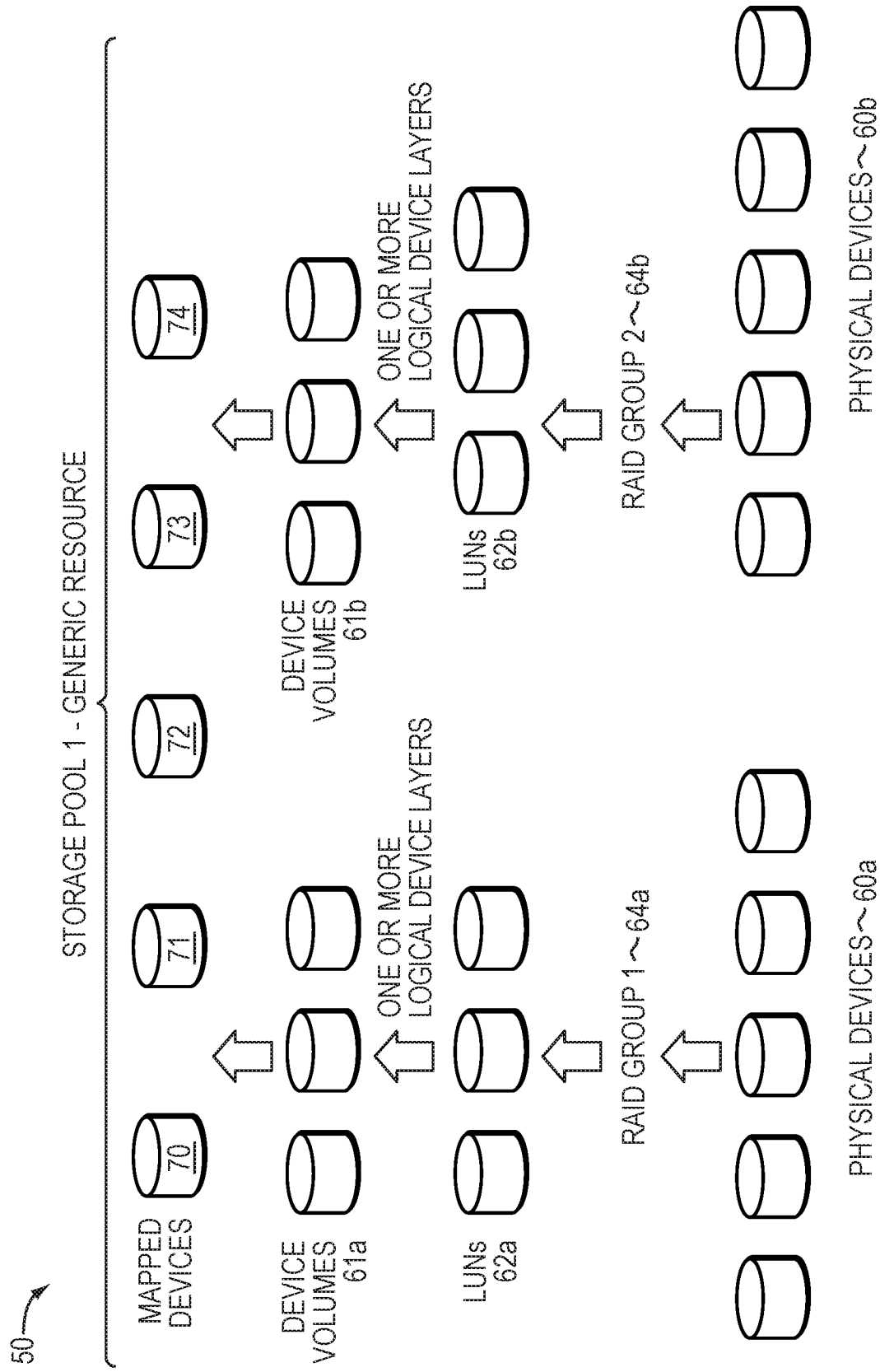
FIG. 4 is an example illustrating storage device layout.

Referring to FIG. 4, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 5:
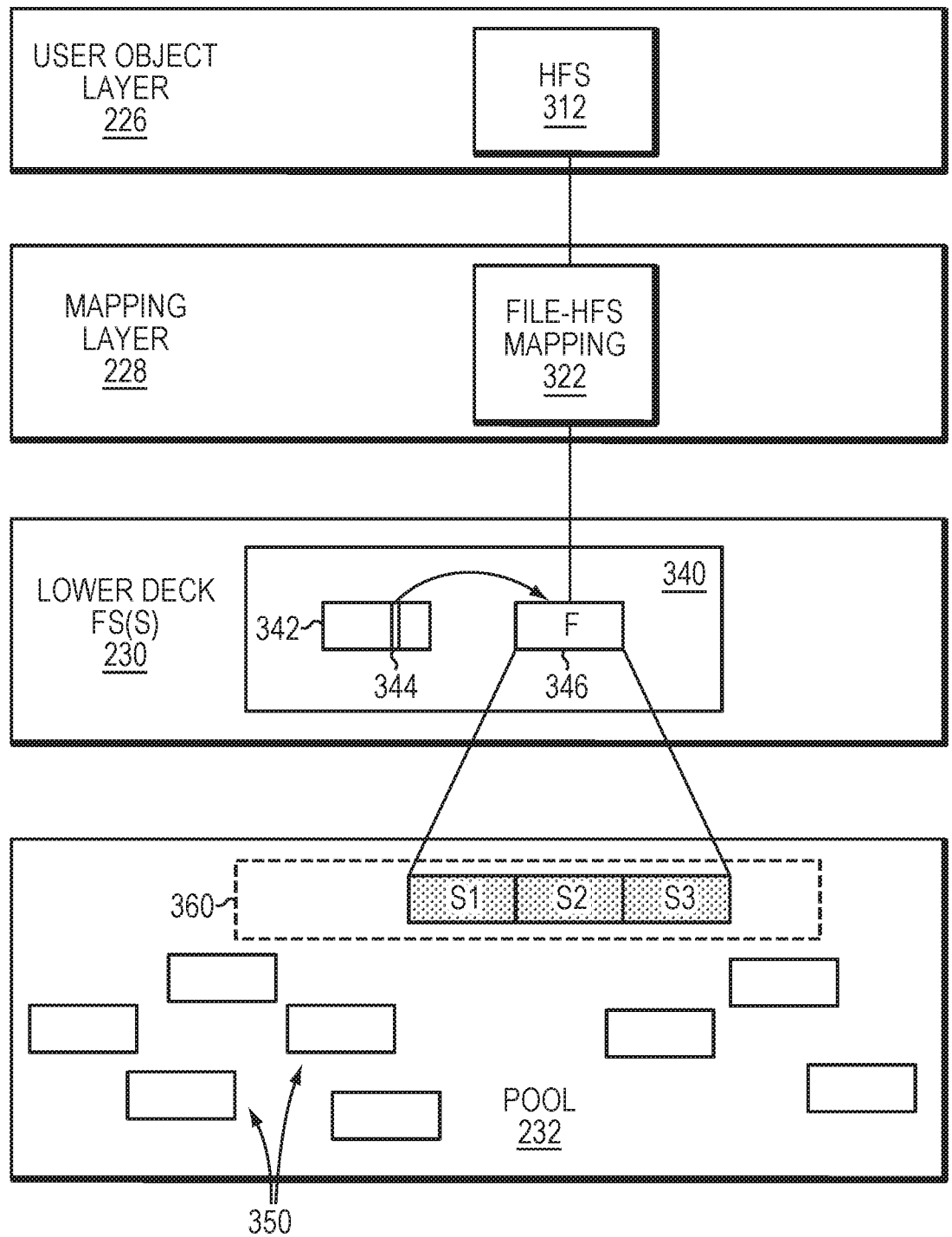
FIGS. 5-11 are diagrams illustrating in more detail components that may be used in connection with techniques herein.

FIG. 5 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. Using the approach described above, the LUN-to-Volume mapping 320 maps the LUN 310 to a first volume 324, and the HFS-to-Volume mapping 322 maps the HFS 312 to a second volume 326. The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored, and may thus be accessed as metadata to identify the locations of the file 346.

Although a single file is shown for the lower-deck file system 340, it is understood that each of the lower-deck file systems 230 may include any number of files, each having its own entry in the respective inode table of its file system. Also, a lower-deck file system may store not only regular files such as the file F 346, but also snapshots (point-in-time copies, also called "snaps") of such files. In this context the original file (e.g., file F 346) is referred to as a "primary" file. For instance, the lower-deck file system 340 stores the primary file 346 along with a different file for every snap of that file (such snaps effectively forming snaps of the HFS 312).

As shown, a set of slices 360 is allocated from the storage pool 232 for storing the file 346. In the example shown, slices S1 through S3 are used for storing the file 346, and thus the data that make up the HFS 312 are stored in the slices S1 through S3. In an example, the storage pool 232 allocates slices 350 to the set of file systems 230 in an on-demand manner, e.g., as the file 246 requires additional storage. The storage pool 232 can also deallocate slices from the set of file systems 230 when all the currently allocated slices are no longer required.

As described more below, at least some of the lower-deck file systems 230 are associated with respective volumes referred to as "sparse volumes". Sparse volumes provide an additional layer of mapping between the lower-deck file systems 230 and the pool 232 and allow the lower-deck file systems 230 to operate as file systems normally do, by accessing underlying volumes. Sparse volumes may also be employed at a higher level, between an HFS 312 and a file of a lower-deck file system 230 that is presented as a volume. Additional details about sparse volumes and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 6:
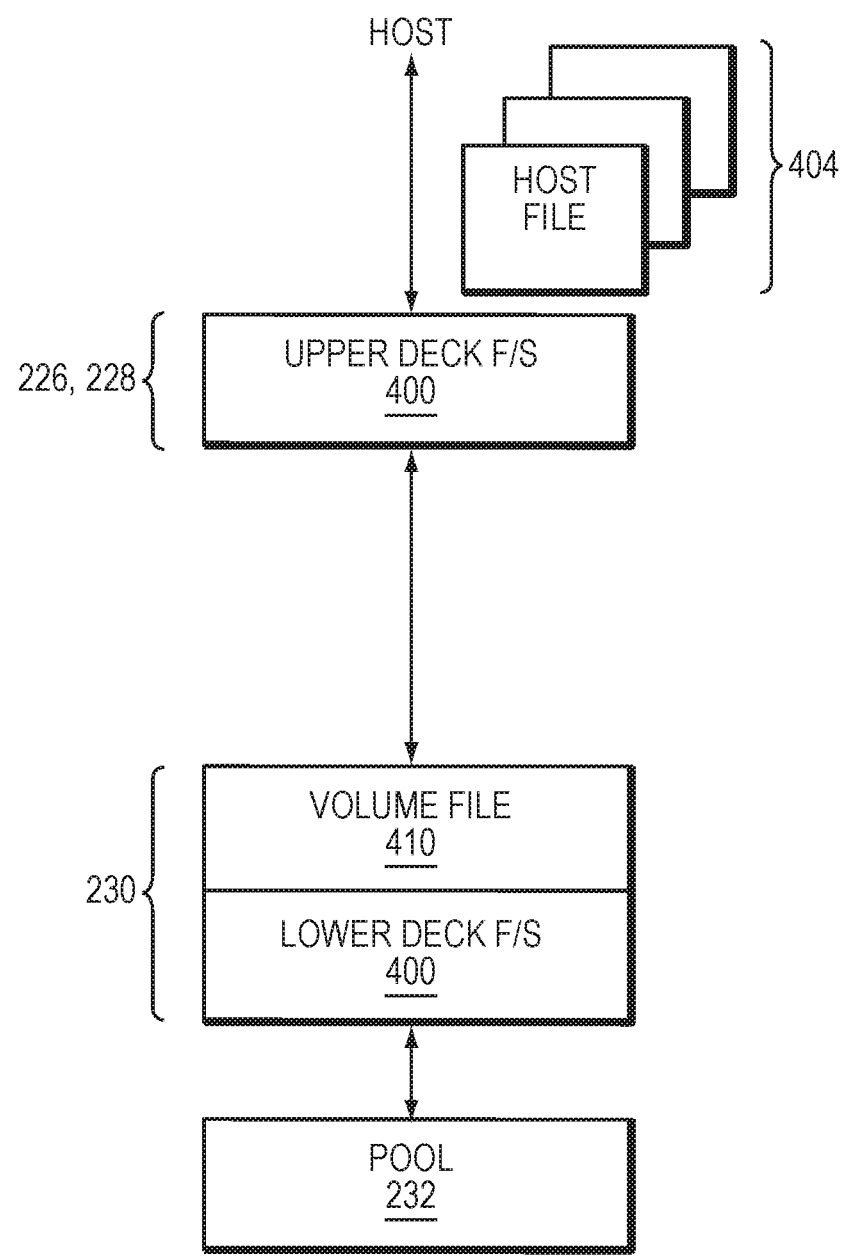

FIG. 6 shows another view of the organization of the data storage system useful for describing certain functionality as presented below. In FIG. 6, the user object and mapping layers 226, 228 include an upper-deck file system 400. As shown, the upper-deck file system 400 presents data in the form of host files 404 to a separate host computer (not shown). The lower-deck file system layer 230 includes a lower-deck file system 406. The lower-deck file system 406 presents a file referred to as a "volume file" 410 to the upper-deck file system 400.

Figure 7:
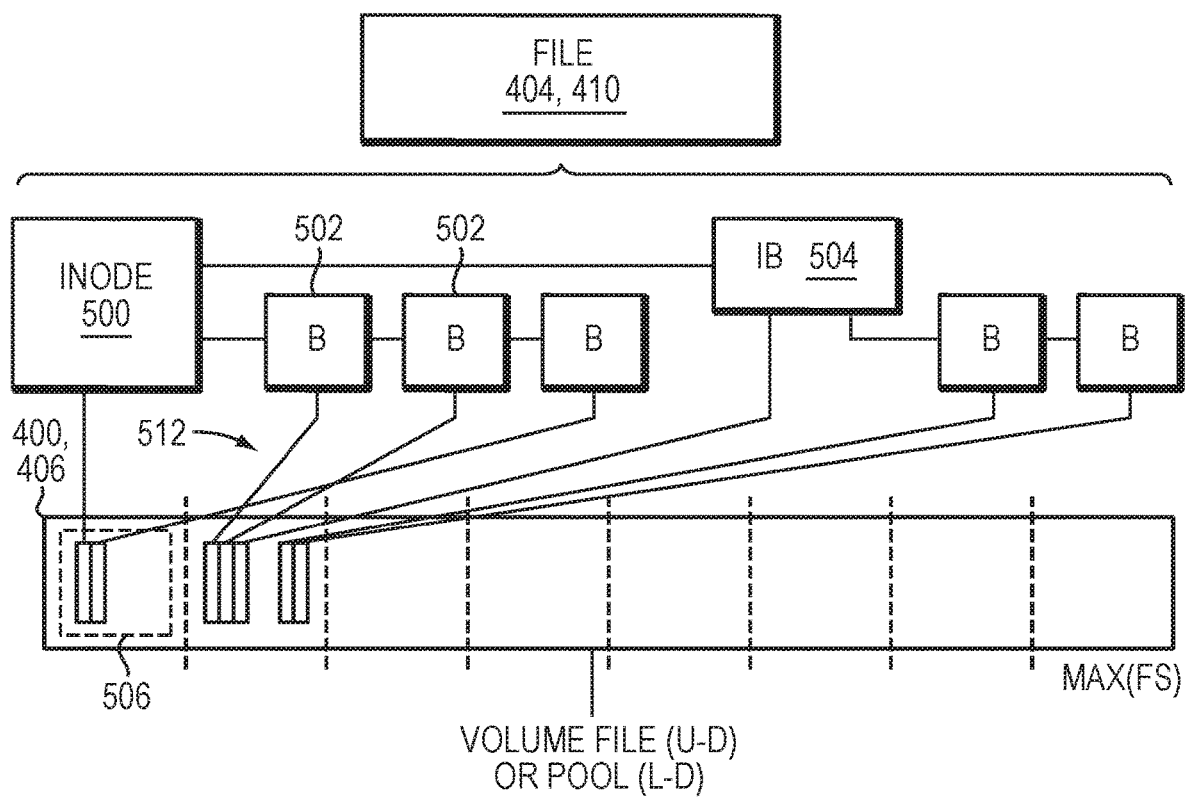

FIG. 7 illustrates certain details regarding files and file systems, applicable at both the upper layer (404, 400 in FIG. 6) and at the lower layer (410, 406) except for certain differences that are noted below. A file 404, 410 is shown as including an Inode 500 and a set of data blocks (B) 502. An indirect block (IB) 504 is also shown. All these items are included in the respective file system 400, 406, which in general will contain multiple files. Thus, the Inode 500 is part of an Inode structure 506 that includes Inodes of other files (not shown) as well as the indirect blocks 504. Additional details about the files 404, 410 and file systems 400, 406 are provided below.

Also shown in FIG. 7 is the relationship of the file 404, 410 to the respective file system. Each file system 400, 406 has a respective maximum size (as may be specified in blocks or bytes, for example) shown as Max(FS). At any given time there is an allocated size corresponding to the amount of underlying storage that is actually allocated for use.

The upper-deck file system 400 draws slices of storage from the volume file 410, while the lower-deck file system 406 draws slices directly from the pool 232. Of course, the volume file 410 is constituted by slices from the pool 232 via operation of the lower-deck file system 406. In many cases it will be desirable that slices defined at the upper level (upper-deck file system 400 and volume file 410) are of the same size, and aligned with, slices as defined in the pool 232 and used by the lower-deck file system 406. However, in general this is not required.

Returning to the files 404, 410, the Inode 500 contains direct pointers to some number of blocks 502 where file data is stored. If the file is sufficiently large, then one or more indirect blocks 504 are used. The Inode 500 contains pointers to the indirect block(s) 504, which in turn include pointers to additional data blocks 502. In typical file systems there may be at most three levels of indirection. In the description below, the term "IB tree" is used to refer to the entire set of IBs 504 and the Inode 500 for a given file.

The IB tree establishes a mapping 512 from a logical linear arrangement of blocks 502 of a file 404, 410 to corresponding block locations in the address space of the file system 400, 406. In general this mapping may be arbitrary, i.e., neither ordering nor adjacencies of blocks need to be preserved, and for such arbitrary mappings it is necessary to traverse the IB tree to locate a block in the file system 400, 406 based on an address of the block in the corresponding file 404, 410. This is the manner of operation of the upper-deck file system 400.

For the lower-deck file system 406, however, there is the possibility of operating in what is referred to as "direct Inode" in which the mapping is constrained in a manner that enables block locations to be identified by calculation rather than by traversing the IB tree. Thus, in such a case, the block ordering is preserved, and block adjacencies are preserved within individual groups. In the simplified example of FIG. 7, this is shown for two groups, one having three blocks 502 and the other having two blocks 502. Calculation is generally much faster than IB tree traversal, and thus direct Inode operation can provide improved file system performance.

In one embodiment, direct Inode is a consequence of there being a single file in the file system 406. Rather than randomly allocating blocks to the file as it writes to them, a linear mapping is used that maps the first block in the file to the first data block in the file system, the second data block in the file to the second data block in the file system, and so on.

If there are no interspersed metadata structures, then the on disk location of any data block in a file can be simply the starting location of all data blocks in the file system plus the offset of the data block in the file. If the data blocks have metadata structures interspersed, the storage address can be algorithmically calculated given the file offset (the block in the file). The algorithm knows where the interspersed data structures are on disk so that it can correctly calculate the address of the data block on disk.

In another embodiment, a "mapped" Inode of operation of a file system 400, 406, in which a logical linear arrangement of blocks 502 viewed as a linear file are mapped to generally arbitrary locations as viewed in the address space of the file system 400, 406. For the upper-deck file system 400, mapped operation is essentially inherent, and there is no other Inode. For the lower-deck file system 406, however, mapped Inode is one of potentially multiple distinct operating Inodes, possible due to the internal nature and specialized use of the lower-deck file system 406 in the data storage system. The remaining description focuses on mapped Inode operation of the lower-deck file system 406 in particular.

In FIG. 7 the mapping is indicated by generally crossing lines 512 extending between the blocks 502 of a volume file 410 and their locations in the lower-deck file system 406. In mapped Inode, the lower-deck file system 406 assigns blocks 502 to regions of its address space in a generally arbitrary manner, at least among groups of blocks 502 that are stored at different times. That is, blocks 502 are assigned to areas of physical storage as the blocks 502 are initially written, and in general a group of blocks 502 being written together will occupy sequential block areas. However, the blocks 502 of one file are generally interspersed with those of other files, and as files grow new areas of physical storage are allocated that are generally not contiguous with or sequentially ordered relative to existing areas where blocks 502 of the file are already stored.

With respect to the lower-deck file system 406 in particular, mapped Inode operation implies a generally arbitrary relationship between blocks of the volume file 410 presented to the upper-deck file system 400 and the blocks as stored in the lower-deck file system 406. To satisfy an I/O request directed to a given block of the volume file 410 generally requires that the lower-deck file system 406 examine (or "traverse") the inode 500 and IB(s) 504 to identify the location of the block within the lower-deck file system 406. This represents a performance penalty, albeit one that is normally deemed acceptable when thin provisioning is used. The tradeoff is one of I/O latency and throughput versus storage efficiency, i.e., efficient use of available physical storage from the pool 232. As described below, in some embodiments a technique may be employed for transitioning a file system to a direct operating Inode in which predetermined calculations can be used instead of Inode/IB traversals.

Figure 8:
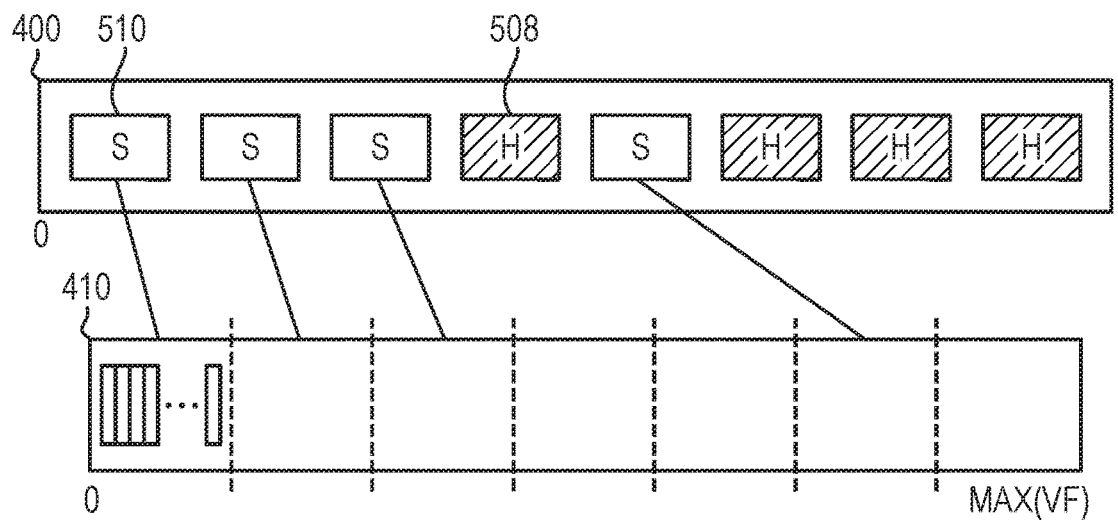

FIG. 8 illustrates the relationship between the upper-deck file system 400 and the volume file 410 presented by the lower-deck file system 406. Slices 510 are created from corresponding slice-size areas of the volume file 410, with a generally arbitrary mapping between their respective locations. Holes 508 are slice-size areas not currently provisioned. As the actual size of the upper-deck file system 400 increases, which is reflected in holes 508 being replaced with slices 510, the size of the volume file 410 is increased accordingly. This demand from the upper-deck file system 400 is passed down to the lower-deck file system 406, to which additional pool slices 350 are allocated to enable the lower-deck file system 406 to grow the size of the volume file 410 accordingly, and this additional space is used to add slices 510 to the upper-deck file system 400. As indicated, the volume file 410 has a maximum size shown as Max(VF). If demand by the upper-deck file system 400 surpasses this value, then subsequent file write operations from a host to the upper-deck file system 400 may be responded to with an out-of-space condition. In one embodiment, this may always occur. In another embodiment, this may be prevented by increasing Max(VF) and allocating additional storage from the pool 232 if available.

Slices 510 may be allocated, de-allocated, re-allocated, reserved, or redistributed by a slice manger. A slice may be, for example, a 1 GB slice of data. Further, a slice may be, for example, a 256 MB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs. The slice manager may be responsible for implementing a slice allocation policy and/or algorithm. For example, the slice manager may receive slice allocation requests, and maintain relevant statistical information regarding slices by using a slice allocation table.

In at least one embodiment of the current technique, the mapping between block pointers of data blocks associated with I/O requests (e.g., read, write) and physical addresses may be arbitrary or even random. The data blocks are therefore likely to reside on different slices and certainly on different stripes of underlying RAID groups.

Figure 9:
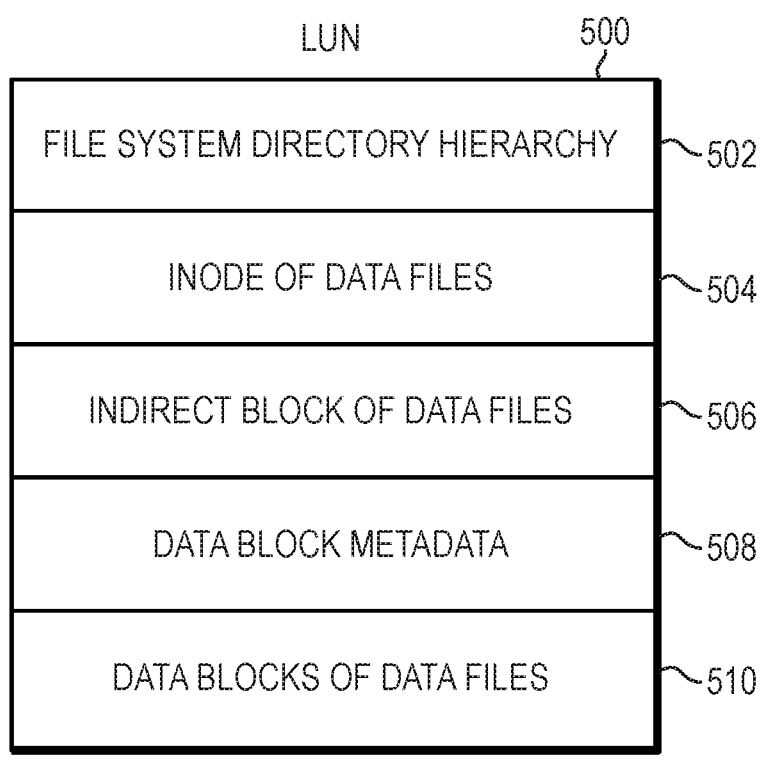

Referring to FIG. 9, shown is a logical representation of a LUN presented to a host and organized as a file system that may be included in an embodiment using the techniques herein. A user of data storage system 12 accesses data from LUNs stored on disk drives 60 in fixed sized chunks. Each fixed size chunk is known as a slice. One or more slices are grouped together to create a slice pool. Host system 14 provisions storage from slice pools for creating LUNs. A LUN 500 is visible to host system 14 and a user of a data storage system 12. Typically, storage is allocated when host system 14 issues a write request and needs a data block to write user's data.

File systems typically include metadata describing attributes of a file system and data from a user of the file system. A file system contains a range of file system blocks that store metadata and data. A file system mapping driver allocates file system blocks from slices of storage for creating files and storing metadata of a file system. In at least some embodiments of the current technique, the file system block may be 8 kilobyte (KB) in size. Further, a user of data storage system 12 creates files in a file system. The file system is organized as a hierarchy. At the top of the hierarchy is a hierarchy of the directories 502 in the file system. Inodes of data files 504 depend from the file system directory hierarchy 502. Indirect blocks of data files 506 depend from the inodes of the data files 504. Data block metadata 508 and data blocks of data files 510 depend from the inodes of data files 504 and from the indirect blocks of data files 506.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block. However, it should be noted that a file system may be organized based on any one of the known mapping techniques such as an extent based binary tree mapping mechanism.

Figure 10:
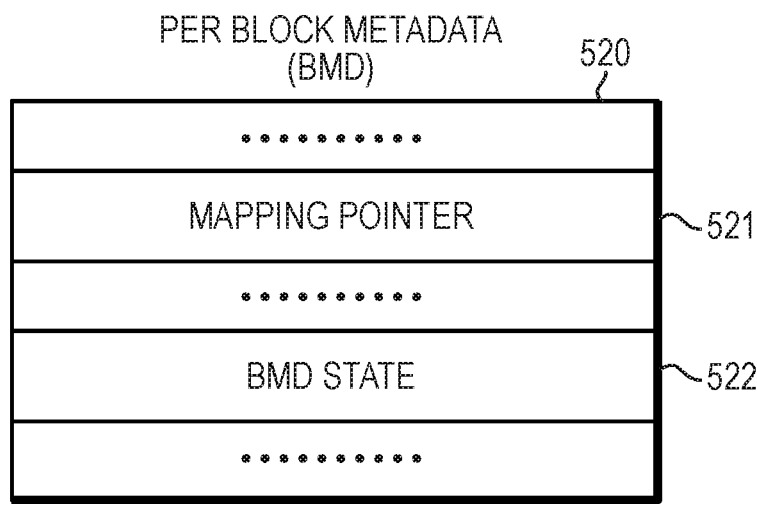

Referring to FIG. 10, shown is a representation of a per block metadata (also referred to as "BMD") for a file system data block that may be included in an embodiment using the techniques described herein. The per-block metadata 520 for a file system data block includes an inode number of a file of the file system, the file system data block number and the logical offset of the file system data block. The per-block metadata 520 for a file system data block also includes an internal checksum protecting the integrity of the information stored in the per-block metadata 520. The per-block metadata for a file system data block may further include a mapping pointer 521 and a data structure indicating state of the per-block metadata 522. The representation of per-block metadata 520, as illustrated in FIG. 10, is for illustrative purposes only, and is not considered a limitation of the current technique described herein.

Figure 11:
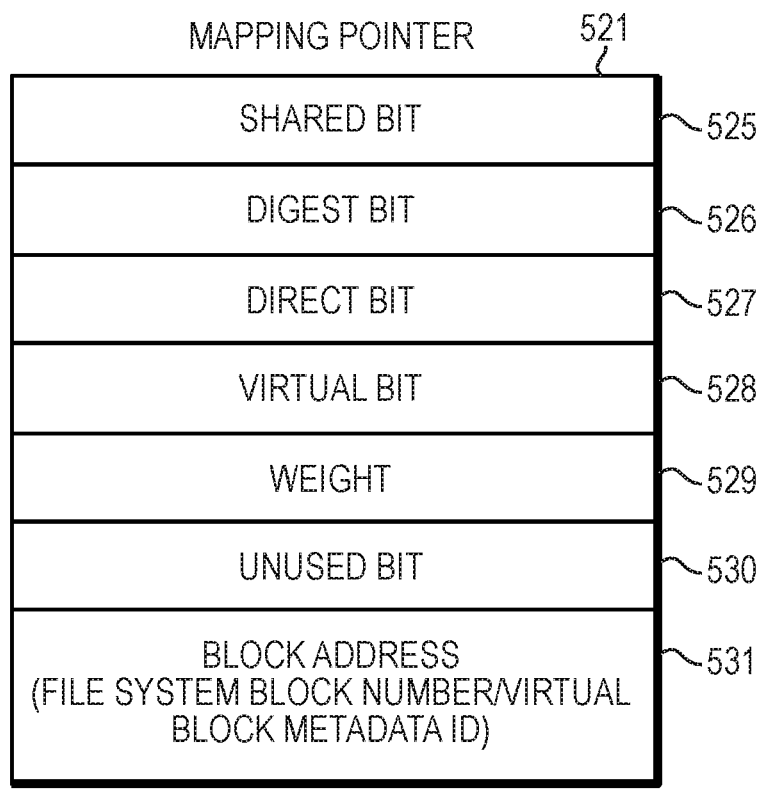

Referring to FIG. 11, shown is a representation of a mapping pointer 521 of a file system data block that may be included in an embodiment using the techniques described herein. Each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block. Mapping pointer 521 includes metadata information such as shared bit 525, digest bit 526, direct bit 527, virtual bit 528, weight 529, unused bit 530 and block address 531. Shared bit 525 of mapping pointer 521 associated with a file system data block indicates whether the data block (or data blocks if the mapping pointer is associated with an indirect block) may be shared. Digest bit 526 of mapping pointer 521 for a file system block indicates whether the file system block has been digested by a deduplication engine. Direct bit 527 of mapping pointer 525 for a file system block indicates whether the physical address of the file system block can be computed algorithmically. Virtual bit 528 of mapping pointer 525 for a file system block indicates whether the mapping pointer is a virtual pointer. Weight 529 of mapping pointer 525 for a file system block indicates a delegated reference count for the mapping pointer 525. The delegated reference count is used by a snapshot copy facility when a replica of a file is created. Mapping pointers of the inode of the file are copied and included in the inode of the replica of the file. In at least one embodiment, mapping pointers of the inode may include mapping pointers pointing to direct data blocks and mapping pointers pointing to indirect blocks. Then, the delegated reference count values stored in the mapping pointers of the file and the replica of the file are updated to indicate that the file and the replica of the file share data blocks of the file. Unused bit 530 of mapping pointer 525 for a file system block indicates an unused space reserved for a future use. Block address 531 of mapping pointer 525 for a file system block indicates the block number of the file system block. Alternatively, block address 531 of mapping pointer 525 may indicate a Virtual Block Metadata ("VBM") identification number which points to a VBM object that points to a data block and includes metadata for the data block. Thus, VBM Id 531 is used to find an object including virtual block metadata. Thus, a VBM object includes file system data block mapping pointer as described in FIG. 11. It also includes a total distributed weight for the VBM object which is the sum of weights of each mapping pointer for a file system block pointing to the VBM object. The VBM object may further includes a mapping pointer which may point to a file system block or another VBM object such that the mapping pointer includes the distributed weight for the mapping pointer.

In response to a request by a client of a storage system to create a snapshot copy of a production file, a virtual block mapping pointer is created that provides a mapping information to a logical block storing data of the file system block of the production file. The file system block includes a pointer pointing back to the metadata of the virtual block mapping pointer. Thus, a new kind of block pointer called virtual block mapping (VBM) pointer enables a migration or re-organization of data blocks to be performed in a non-disruptive fashion that is transparent to a file system manager because pointers to logical data blocks may be changed dynamically without having to change block pointers in inodes and indirect blocks pointing to the data blocks.

The representation of mapping pointer 525, as illustrated in FIG. 11, is for illustrative purposes only, and is not considered a limitation of the current technique described herein. Thus, it should be noted that fields 525-531 included in the mapping pointer 525 may reside in different metadata structures.

When a snapshot copy of a file is deleted, a portion of the file is truncated, or a portion of a snapshot copy of the file is truncated, each indirect block in a file system block hierarchy corresponding to a portion of a file or a snapshot copy of the file which is being deleted or truncated is evaluated such that a sibling indirect data block is determined for each indirect data block from file system hierarchies of snapshot copies of the file included in a version set to which the file belongs such that the indirect data block and the sibling indirect data block shares the most data blocks compared to other indirect data blocks in the file system hierarchies. Upon finding a sibling indirect data block for an indirect data block that has been selected for deletion, reference count for each shared data block pointed to by the indirect data block is returned to corresponding shared data block mapping pointer included in the sibling indirect data block instead of updating per-block metadata of each shared data block. It should be noted that an indirect data block may be selected from a file system hierarchy of a file when the file is deleted, the file is truncated, zeros are written to a portion of the file (also referred to as "punching a hole"), or data blocks are freed and returned to a storage device. Returning weight value for each shared data block pointed to by an indirect data block of a file to reference count values in a sibling indirect data block may also be referred to as "reverse indirect block split" operation as it operates in an opposite manner to a write split operation described above herein.

Generally, a delete or truncate operation for a file and/or snap of the file traverses a file system hierarchy for the file or the snap of the file in a top-down manner such that each indirect data block included in such file system hierarchy is traversed until each file system data block in each leaf indirect data block is evaluated. The processing of a leaf indirect data block includes processing each file system data block of the leaf indirect block where sharing status of each file system data block is evaluated. If a file system block of a snap processed for deletion is no longer referenced by any other active snaps, the file system block is deallocated and storage space associated with the file system block is freed. However, if a file system block of a snap processed for deletion is referenced by other active snaps, the file system block is not freed but metadata (e.g., delegated reference count) associated with the file system block is updated to decrement the reference to the file system data block.

Generally, the total distributed reference count value of a file system data block and a sharing status is maintained in per-block metadata of the file system data block. Typically, per-block metadata of a file system data block is either read from a cache or retrieved from a storage device if it does not reside in the cache to evaluate the sharing status of the file system data block. Further, in such a system, the delegated reference count value included in a mapping pointer of a file system data block is compared with the total distributed reference count value ("weight") stored in the per-block metadata.

In at least one embodiment of the current technique, sharing status of each file system data block included in a portion of file identified for deletion is evaluated to determine whether the file system data block can be freed if no other active snap refers to the file system data block. Upon determining that a file system block is "owned" indicating that the file system data block has not been shared by any other active snap and is only referenced by the file selected for deletion, the file system block may be deallocated and storage space associated with the file system data block may be reclaimed as free storage. Such file system block may also be referred to herein as uniquely allocated file system block. However, upon determining that a file system data block is "shared" indicating that the file system data block is either shared by more than one snap where one of the snap may not have been selected for deletion, the reference to the file system data is decremented by using the delegating reference counting mechanism described above herein.

Figure 12:
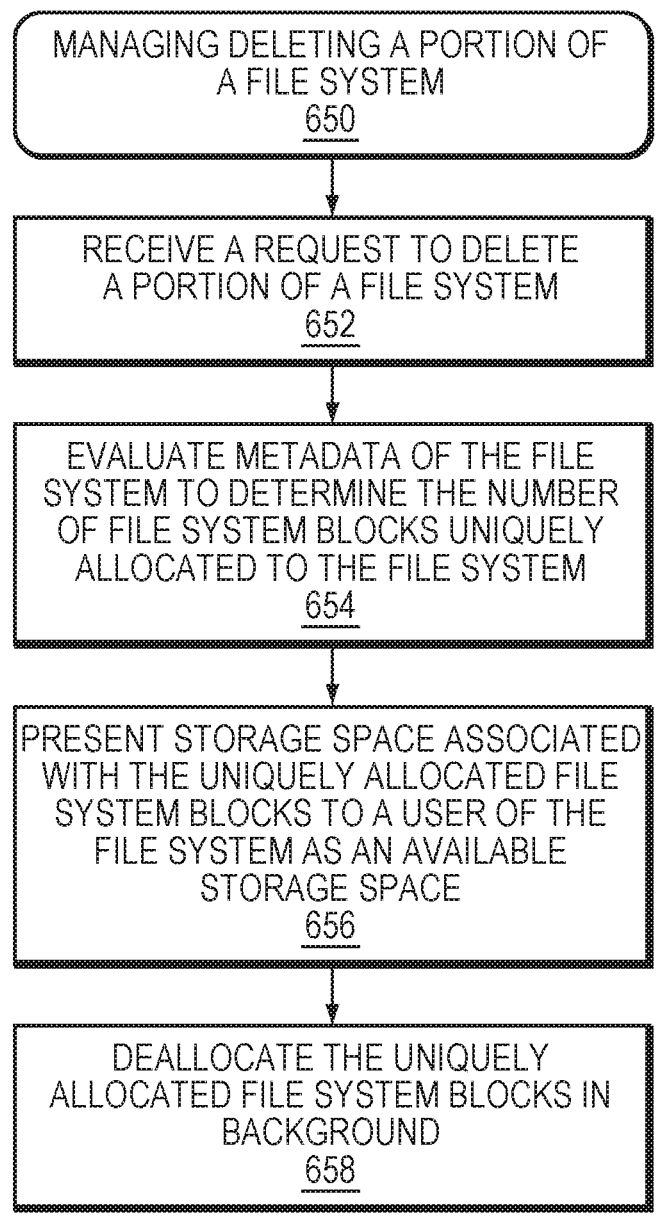
FIG. 12 is a flow diagram illustrating processes that may be used in connection with techniques herein.

Referring to FIG. 12, shown is a flow diagram illustrating a flow of data in the data storage system. With reference also to FIGS. 1-11, in at least one embodiment of the current technique, a file delete or a file truncate operation is performed on a file (step 650). A file delete operation deletes the entire contents of a file identified for deletion. However, a file truncate operation performed on a file reduces the size of the file by deleting a portion of the file. Upon receiving a request to either delete a file or truncate a file by deleting a portion of the file (step 652), metadata of the file is evaluated to determine the number of file system blocks that are uniquely allocated to the file indicating that such file system blocks are not shared with any replicas of the file and thus can be deallocated (step 654). Storage space associated with such uniquely allocated file system blocks is reported to a user of the file as available storage space in the file indicating that such storage space is available for use by the user (step 656). The file system blocks included in the portion of the file identified for truncation is deleted by using delegated reference count mechanism described above herein which includes updating metadata of file system blocks included in the portion of the file. Further, the uniquely allocated file system blocks are deallocated asynchronously by a background process at a later time (step 658).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing truncation of files of file systems, the method comprising:
    receiving a request to delete a portion of a file of a file system, wherein the file system includes a plurality of files, wherein a set of file system blocks are included in the portion of the file identified for deletion;
    evaluating metadata of each file system block of the set of file system blocks included in the portion of the file identified for deletion for determining a number of file system blocks from the set of file system blocks that are available for de-allocation, wherein evaluating the metadata of each file system block includes determining whether each file system block has been uniquely allocated to the file and has not been shared with a replica of the file; and
    based on the evaluation, presenting storage space associated with the number of file system blocks as available storage space to a user of the file;
    asynchronously de-allocating the number of file system blocks; and
    synchronizing the de-allocating of the number of file system blocks with incoming I/O requests to avoid I/O errors resulting from unavailability of storage space required for I/O operations directed to the file.

2. The method of claim 1, wherein evaluating the metadata of the file further comprises counting the number of file system blocks that are uniquely allocated to the portion of the file identified for deletion, wherein a uniquely allocated file system block is not shared with other files of the file system.

3. The method of claim 1, wherein the number of file system blocks associated with the portion of the file that are available for de-allocation is stored in an inode of the file.

4. The method of claim 1, wherein the file system blocks associated with the portion of the file that are available for de-allocation are deleted in background.

5. The method of claim 1, wherein the portion of the file is deleted based on a delegated reference counting mechanism.

6. The method of claim 1, wherein the file is truncated in size by deleting the portion of the file.

7. The method of claim 1, wherein a mapping pointer is associated with a file system block, wherein the mapping pointer includes a distributed weight indicating whether the file system block has been shared.

8. The method of claim 1, wherein a file system mapping component manages a file system, wherein the file system includes a set of files, each file associated with an inode, wherein the inode of a file includes metadata of the file, wherein the file system is associated with a set of sparse volumes, wherein a sparse volume includes a set of slices, each slice of the set of slices is a logical representation of a subset of physical disk storage.

9. The method of claim 8, wherein the file system resides on a storage system, wherein the storage system includes a disk drive system comprising a plurality of Redundant Array of Inexpensive Disks (RAID) systems, each RAID system of the plurality of RAID systems having a first disk drive and a second disk drive.

10. A system for use in managing truncation of files of file systems, the system comprising a processor configured to:
   receive a request to delete a portion of a file of a file system, wherein the file system includes a plurality of files, wherein a set of file system blocks are included in the portion of the file identified for deletion;
   evaluate metadata of each file system block of the set of file system blocks included in the portion of the file identified for deletion for determining a number of file system blocks from the set of file system blocks that are available for de-allocation, wherein evaluating the metadata of each file system block includes determining whether each file system block has been uniquely allocated to the file and has not been shared with a replica of the file; and
   based on the evaluation, present storage space associated with the number of file system blocks as available storage space to a user of the file;
   asynchronously de-allocating the number of file system blocks; and
   synchronizing the de-allocating of the number of file system blocks with incoming I/O requests to avoid I/O errors resulting from unavailability of storage space required for I/O operations directed to the file.

11. The system of claim 10, wherein evaluating the metadata of the file further comprises counting the number of file system blocks that are uniquely allocated to the portion of the file identified for deletion, wherein a uniquely allocated file system block is not shared with other files of the file system.

12. The system of claim 10, wherein the number of file system blocks associated with the portion of the file that are available for de-allocation is stored in an inode of the file.

13. The system of claim 10, wherein the file system blocks associated with the portion of the file that are available for de-allocation are deleted in background.

14. The system of claim 10, wherein the portion of the file is deleted based on a delegated reference counting mechanism.

15. The system of claim 10, wherein the file is truncated in size by deleting the portion of the file.

16. The system of claim 10, wherein a mapping pointer is associated with a file system block, wherein the mapping pointer includes a distributed weight indicating whether the file system block has been shared.

17. The system of claim 10, wherein a file system mapping component manages a file system, wherein the file system includes a set of files, each file associated with an inode, wherein the inode of a file includes metadata of the file, wherein the file system is associated with a set of sparse volumes, wherein a sparse volume includes a set of slices, each slice of the set of slices is a logical representation of a subset of physical disk storage.

18. The system of claim 17, wherein the file system resides on a storage system, wherein the storage system includes a disk drive system comprising a plurality of Redundant Array of Inexpensive Disks (RAID) systems, each RAID system of the plurality of RAID systems having a first disk drive and a second disk drive.

\* \* \* \* \*